(12) United States Patent
Qiu et al.

(10) Patent No.: US 12,510,220 B2
(45) Date of Patent: Dec. 30, 2025

(54) OPTICAL ELEMENT, VEHICLE LIGHT MODULE, VEHICLE LIGHT AND VEHICLE

(71) Applicant: HASCO Vision Technology Co., Ltd., Shanghai (CN)

(72) Inventors: Zhiping Qiu, Shanghai (CN); Fang Liu, Shanghai (CN); Cong Li, Shanghai (CN); Langrun Jin, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/857,124

(22) PCT Filed: Apr. 20, 2022

(86) PCT No.: PCT/CN2022/087936
§ 371 (c)(1),
(2) Date: Oct. 15, 2024

(87) PCT Pub. No.: WO2023/201573
PCT Pub. Date: Oct. 26, 2023

(65) Prior Publication Data
US 2025/0251102 A1 Aug. 7, 2025

(51) Int. Cl.
F21S 41/24 (2018.01)
F21S 41/147 (2018.01)
(Continued)

(52) U.S. Cl.
CPC ............ F21S 41/24 (2018.01); F21S 41/147 (2018.01); F21S 41/148 (2018.01); F21S 41/20 (2018.01);
(Continued)

(58) Field of Classification Search
CPC .......... F21S 41/24; F21S 41/27; F21S 41/265; F21S 43/235; F21S 43/241; F21S 43/245; F21S 43/26221; F21S 43/26411
See application file for complete search history.

(56) References Cited

U.S. PATENT DOCUMENTS 12,209,725 B2 1/2025 Suwa et al.
2007/0183714 A1 8/2007 Haenen et al.
(Continued)

FOREIGN PATENT DOCUMENTS

CN 109073184 A 12/2018
CN 212298842 U 1/2021
(Continued)

OTHER PUBLICATIONS

Written Opinion of European family application. Global Dossier (Year: 2025).*

(Continued)

Primary Examiner — Keith G. Delahoussaye
(74) Attorney, Agent, or Firm — Volpe Koenig

(57) ABSTRACT

An optical element, a vehicle light module, a vehicle light, and a vehicle. The optical element comprises a plurality of optical units. Each optical unit comprises a light incident surface (11), a light guide part (12), and a light-emitting surface (13). The light incident surfaces (11) are located on the same plane and are successively connected so as to form an optical element light incident surface. The light guide parts (12) are arranged such that light rays emitted from the optical element light incident surface can be guided so as to be emitted from the corresponding light-emitting surfaces (13). The light-emitting surfaces (13) are arranged in a preset form. The optical element is provided with the light-emitting surfaces (13) having a smaller width dimension. therefore is suitable for elongated vehicle lights of (Continued)

different sizes, and has the advantages of a high integration level, high optical efficiency and a small size.

18 Claims, 16 Drawing Sheets

(51) Int. Cl.
| | |
|---|---|
| F21S 41/148 | (2018.01) |
| F21S 41/20 | (2018.01) |
| F21S 41/265 | (2018.01) |
| F21S 41/27 | (2018.01) |
| F21S 41/32 | (2018.01) |
| F21S 41/37 | (2018.01) |
| F21S 43/20 | (2018.01) |
| F21S 43/235 | (2018.01) |
| F21S 43/241 | (2018.01) |
| F21S 43/245 | (2018.01) |

(52) U.S. Cl.
CPC ............ *F21S 41/265* (2018.01); *F21S 41/27* (2018.01); *F21S 41/322* (2018.01); *F21S 41/37* (2018.01); *F21S 43/235* (2018.01); *F21S 43/241* (2018.01); *F21S 43/245* (2018.01); *F21S 43/26221* (2024.05); *F21S 43/26411* (2024.05)

(56) References Cited

U.S. PATENT DOCUMENTS

| | | |
|---|---|---|
| 2008/0205081 A1 | 8/2008 | Ijzerman et al. |
| 2015/0183525 A1 | 7/2015 | De Jager |
| 2015/0241616 A1* | 8/2015 | Bungenstock ....... G02B 6/0018 362/511 |
| 2016/0116666 A1* | 4/2016 | Sato .................. F21S 43/26261 362/509 |
| 2016/0216431 A1 | 7/2016 | Sakuragi |
| 2016/0252228 A1 | 9/2016 | Martinez et al. |
| 2017/0241615 A1* | 8/2017 | Luo ..................... G02B 6/0068 |
| 2019/0078747 A1* | 3/2019 | Wu ..................... G02B 27/0905 |
| 2023/0050282 A1* | 2/2023 | Mun .................... F21S 41/143 |
| 2023/0117279 A1* | 4/2023 | Lee ...................... F21S 41/143 362/520 |

FOREIGN PATENT DOCUMENTS

| | | |
|---|---|---|
| CN | 113028355 A | 6/2021 |
| CN | 113418172 A | 9/2021 |
| DE | 102010012746 | 9/2011 |
| EP | 2372235 A2 | 10/2011 |
| EP | 2587120 A1 | 5/2013 |
| EP | 3062015 A2 | 8/2016 |
| EP | 4001743 A1 | 5/2022 |
| JP | 2003007112 A | 1/2003 |
| JP | 2007234385 A | 9/2007 |
| JP | 2007529859 A | 10/2007 |
| JP | 2009509296 A | 3/2009 |
| JP | 2016139465 A | 8/2016 |
| JP | 2020-187936 A | 11/2020 |
| JP | 7031087 B1 | 3/2022 |
| WO | 2017120630 A1 | 7/2017 |
| WO | 2021078114 A1 | 4/2021 |

OTHER PUBLICATIONS

International Search Report and Written Opinion of PCT/CN2022/087936.

* cited by examiner

OPTICAL ELEMENT, VEHICLE LIGHT MODULE, VEHICLE LIGHT AND VEHICLE

FIELD

The present disclosure relates to vehicle lamp lighting devices, in particular to an optical element. In addition, the present disclosure further relates to a vehicle light module having the optical element, a vehicle light having the vehicle light module, and a vehicle having the vehicle light.

BACKGROUND

As the automobile industry is developed rapidly and people's living conditions are improved continuously, automobiles have become one of the indispensable means of transportation for people to travel. The quantity of automobiles has increased year by year, and the popularity of automobiles has led to the development of manufacturing and design of automobile parts. For example, people have higher and higher requirements for vehicle lamps, the role of vehicle lamps is no longer limited to functional lighting, and the appearance effect of vehicle lamps has become a pursuit of consumers.

There are more and more demands for vehicle lamp modules with narrow and long light emergent surfaces in the market. The requirement for the size of the light emergent surface of a vehicle lamp is that the dimension in the top-bottom direction may be smaller than or equal to 30 mm, especially smaller than or equal to 20 mm. In the prior art, there are vehicle lamp modules that have a light-emitting window of vehicle lamp smaller than 30 mm and optimally about 10 mm. For example, the size of the light emergent surface of the lens is defined so that the dimension of the lens in the top-bottom direction is smaller than or equal to 20 mm and the dimension in the left-right direction is 30 mm to 100 mm. However, the size of the light emergent surface of the lens in the prior art is large. If the size of the lens is reduced directly or in combination with the reduction of the optical elements, the requirements for light shape, optical performance and optical efficiency can't be met, a good better effect can't be achieved while making a tradeoff between the light-emitting efficiency and the dimension of the light emergent surface in the top-bottom direction, a narrower light emergent surface, for example, in width of 8 mm, 5 mm, or 3 mm, can't be obtained while ensuring the light-emitting efficiency, and the increasingly higher demand for the appearance of the vehicle lamp can't be met.

Therefore, it is necessary to design a novel optical element to solve the above technical problems.

SUMMARY

A technical problem to be solved in a first aspect of the present disclosure is to provide an optical element, which has a light emergent surface with narrower width, is suitable for use on narrow and long-shaped vehicle lamps of different sizes, and has the advantages of high level of integration, high optical efficiency, and small size, etc.

A technical problem to be solved in a second aspect of the present disclosure is to provide a vehicle light module, which comprises an optical element that has a narrow and long shape and has the advantages of high level of integration, high optical efficiency, and small size, etc.

A technical problem to be solved in a third aspect of the present disclosure is to provide a vehicle light having a narrow and long appearance.

A technical problem to be solved in a fourth aspect of the present disclosure is to provide a vehicle with a vehicle light having a narrow and long appearance.

In order to solve the above technical problems, in a first aspect, the present disclosure provides an optical element, which comprises a plurality of optical units, each optical unit comprises a light incident surface, a light guide part, and a light-emitting surface, the light incident surfaces are located on the same plane and are successively connected so as to form an optical element light incident surface; each light guide part is arranged to be capable of diverting the light incident into the optical element light incident surface to the corresponding light-emitting surface; and the light-emitting surfaces are arranged in a preset form.

Optionally, the light part portion comprises side surfaces at different inclination angles with respect to the corresponding light incident surface, the side surfaces are located on left and right sides of the light guide part, and a part of the light incident through the light incident surface can be reflected when reaching each side surface.

Furthermore, a first reflecting surface is arranged between the light guide part and the corresponding light-emitting surface, and the first reflecting surface is arranged to be capable of reflecting the light emerging from the light guide part to the corresponding light-emitting surface so that the light emerges from the light-emitting surface.

Specifically, the first reflecting surface is a fully reflecting surface.

Further specifically, the first reflecting surface is provided with a reflection-enhancing film.

Optionally, an included angle between the first reflecting surface and the corresponding light incident surface is 30-90 degrees.

Optionally, the side surface is provided with a reflection-enhancing film.

Optionally, the side surfaces on the same side of the light guide part are located in the same plane, a second reflecting surface is arranged between each light guide part and the corresponding light-emitting surface, and the second reflecting surface is arranged to be capable of reflecting the light emerging from the light guide part to the corresponding light-emitting surface so that the light emerges from the light-emitting surface.

Optionally, the light-emitting surfaces are located in the same plane and connected in sequence to form a light emergent surface of the optical element.

Optionally, the light-emitting surface comprises a plurality of light emergent unit surfaces arranged in a preset form.

Optionally, the width of the light incident surface is the same as the width of the light-emitting surface.

Optionally, the plurality of optical units are connected to form an integrally formed part.

In a second aspect, the present disclosure provides a vehicle light module, which is provided with a collimating optical unit and the optical element described in any of the above technical schemes, wherein the collimating optical unit is arranged to concentrate and collimate the light emitted from a light source to the light incident surface of the optical element.

Optionally, the collimating optical unit is a parabolic reflector, which is arranged to be capable of reflecting the light emitted from the light source to the light incident surface of the optical element.

Optionally, the collimating optical unit comprises a light concentrating cup integrally connected with the optical element, and the light concentrating cup is arranged to be capable of concentrating and collimating the light emitted from the light source to the light incident surface of the optical element.

Furthermore, the collimating optical unit further comprises a first lens, which is located between the light concentrating cup and the light incident surface of the optical element to concentrate and collimate the light emerging from the light concentrating cup to the light incident surface of the optical element.

Still furthermore, a light baffle plate is arranged between the first lens and the light concentrating cup for forming a low-beam cutoff line.

Optionally, the collimating optical unit comprises a light concentrator and a second lens that is located between the light concentrator and the light incident surface of the optical element to concentrate and collimate the light emerging from the light concentrator to the light incident surface of the optical element.

Furthermore, the light concentrator is provided with a first cutoff line structure for forming a low-beam cutoff line on a rear edge of an upper end face of the light concentrator.

Optionally, the collimating optical unit is a collimating light guide element, which comprises a light incident portion, a light transmission portion and a light emergent portion that are connected in sequence and integrally formed.

Optionally, the light incident portion is a concentrating structure for concentrating the light, and the light emergent portion is a curved surface protruding toward the light incident surface of the optical element.

Optionally, the light transmission portion is provided with a second cutoff line structure for forming a low-beam cutoff line.

In a third aspect, the present disclosure provides a vehicle light, which is provided with the vehicle light module described in any of the above technical schemes.

In a fourth aspect, the present disclosure provides a vehicle, which is provided with the vehicle light described in the above technical scheme.

According to the above technical scheme, during use, the light incident surface of the optical element is used as an integral structure, and the light emitted from a light source enters the optical element from the light incident surface of the optical element, and is diverted by the light guide parts, and the diverted light reaches corresponding light-emitting surfaces. Compared with the existing vehicle light modules having a narrow and long light-emitting surface in the prior art, in the design of the optical element in the present disclosure, the width of the light-emitting surface can be reduced while the light-emitting efficiency is ensured, which is to say, the light-emitting surface can be narrower, for example, in width of 8 mm, 5 mm, or 3 mm, etc., and the optical element is suitable for use on narrow and long vehicle lights of different sizes, and has the advantages of high level of integration, high optical efficiency, and small size, etc. Moreover, the light-emitting surfaces can be arranged as required, so as to realize different lighting effects on the light emergent surfaces and the lighting effects are more diversified.

Other advantages of the present disclosure and the technical effects of preferred embodiments will be further detailed below in embodiments.

DETAILED DESCRIPTION

Figure 1:
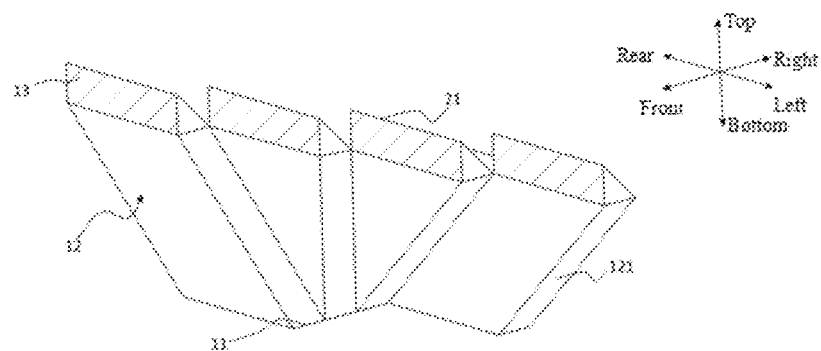
FIG. 1 is a schematic structural diagram of the optical element in a first embodiment of the present disclosure.

In the description of the present disclosure, unless otherwise stated, an orientational or positional relationship indicated by a term "front", "rear", "top", "bottom", "left" or "right" is based on the orientational or positional relationship of the optical element in the present disclosure after the optical element is normally installed in a vehicle. For example, the direction indicated by the term "front" is the normal travel direction of the vehicle, and the term "rear" is opposite to the direction indicated by the term "front"; the direction indicated by the term "top" or "bottom" refers to the top or bottom direction of the vehicle during normal travel, and the direction indicated by the term "left" or "right" refers to the left or right direction of the vehicle during normal travel. These terms are based on the orientational or positional relationships shown in the accompanying drawings, and don't indicate or imply that the device or element may have a specific orientation or be constructed and operated in a specific orientation. Therefore, these terms can't be understood as constituting any limitation on the present disclosure; the terms indicating the orientations of the optical element in the present disclosure may be understood in combination with the actual installed state of the optional element.

In the present disclosure, it may be noted that the terms "install", "arrange" and "connect", etc. shall be interpreted in their general meanings, for example, a "connection" may be a fixed connection, a detachable connection, or an integral connection; may be a direct connection or an indirect connection via an intermediate medium, or internal communication between two elements or interaction between two elements, unless otherwise specified and defined explicitly. Those having ordinary skills in the art may interpret the specific meanings of the terms in the present disclosure in their context.

In addition, the terms "first" and "second" are only for a descriptive purpose, but shall not be understood as indicating or implying relative importance or implicitly indicating the quantity of the indicated technical features. Therefore, features defined by "first" or "second" may be expressly or impliedly include one or more features.

The present disclosure will be detailed below in embodiments, with reference to the accompanying drawings. However, it may be understood that the embodiments described herein are only provided for explain and interpret the present disclosure, and the scope of protection of the present disclosure is not limited to those embodiments.

Please see FIGS. 1 to 33. The present disclosure provides an optical element comprising a plurality of optical units, each optical unit comprises a light incident surface 11, a light guide part 12 and a light-emitting surface 13, the light incident surfaces 11 are located on the same plane and are successively connected so as to form an optical element light incident surface; each light guide part 12 is arranged to divert the light incident into the light incident surface to a corresponding light-emitting surface 13; and the light-emitting surfaces 13 are arranged in a preset form.

Figure 2:
FIG. 2 is a lighting effect diagram of the optical element shown in FIG. 1, which is observed at different positions outside the vehicle light, in the first embodiment of the present disclosure.
Figure 3:
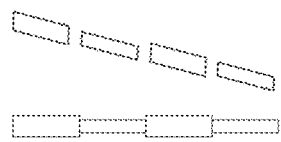
FIG. 3 is a lighting effect diagram of the optical element with light-emitting surfaces in different widths arranged in sequence, which is observed at different positions outside the vehicle light, in the first embodiment of the present disclosure.
Figure 4:
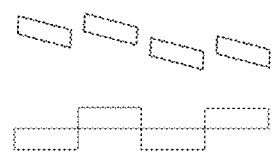
FIG. 4 is a lighting effect diagram of the optical element with light-emitting surfaces in the same width arranged in a transverse direction and staggered from each other in the top-bottom direction, which is observed at different positions outside the vehicle light, in the first embodiment of the present disclosure.
Figure 5:
FIG. 5 is a lighting effect diagram of the optical element with light-emitting surfaces in the same width arranged in a longitudinal direction, which is observed at different positions outside the vehicle light, in the first embodiment of the present disclosure.

The optical element light incident surface is a plane formed by the light incident surfaces 11 located in the same plane, and the light emitted from a light source is incident into the light incident surface of the optical element, and diverted by the light guide part 12 to corresponding light-emitting surfaces 13. Therefore, compared with the existing vehicle light modules having a narrow and long light emergent surface in the prior art, the light-emitting surface 13 in the present disclosure can be narrower in width, providing a narrower light-emitting surface 13 that is in width smaller than 10 mm and has higher optical efficiency. Therefore, the optical element is suitable for use on narrow and long-shaped vehicle lights of different sizes, and realizes a linear vehicle light shape. Moreover, the light-emitting surfaces 13 can be arranged in a preset form, so as to realize diversified lighting effects. For example, as shown in FIGS. 2 to 4, the light incident surface of the optical element may be regarded as being divided into a plurality of light incident surfaces 11 in a direction, and the light incident surfaces 11 are located at the bottom, and correspondingly, light-emitting surfaces 13 extending in a transverse direction (left-right direction as shown in the figure) are formed, and the light-emitting surfaces 13 are located at the top. FIGS. 2 to 4 show lighting effects of the light emergent surface of the optical element observed at two positions outside the vehicle lamp. The arrangement of the light emergent surfaces 13 corresponding to the lighting effect shown in FIG. 2 is that the light-emitting surfaces 13 are arranged in sequence in a left-right direction and are arranged in a depth form in a front-rear direction, and the light-emitting surfaces 13 are in the same shape and size; the arrangement of the light-emitting surfaces 13 corresponding to the lighting effect shown in FIG. 3 is the same as the arrangement in FIG. 2, but the light-emitting surfaces 13 are different in width; the arrangement of the light-emitting surfaces 13 corresponding to the lighting effect shown in FIG. 4 is similar to the arrangement in FIG. 2, but the light guide parts 12 are different in length in a top-bottom direction, so that the light-emitting surfaces 13 are staggered from each other in the top-bottom direction. Alternatively, as shown in FIG. 5, the light incident surface of the optical element may be regarded as being divided into several light incident surfaces 11 in a direction perpendicular to the direction shown in FIGS. 2 to 4, and correspondingly, light-emitting surfaces 13 extending in a longitudinal direction (extending in the top-bottom direction as shown in the figure) are formed. FIG. 5 shows the lighting effect of the light-emitting surface 13 of the optical element observed at two positions outside the vehicle light. The light incident surfaces 11 may be in the same width or different in width; likewise, the light-emitting surfaces 13 may be in the same width or different in width, depending on the requirement for the form of the light-emitting 13 surfaces, i.e., the preset form. It can be seen that the optical element in the present disclosure enables a vehicle light to have more diversified forms and lighting effects while meeting the lighting requirements, and can present light-emitting surfaces 13 with different width, length, interval and depth effects.

In order to make the technical scheme of the present disclosure understood better, in some drawings, the light-emitting surfaces 13, and the light incident surface of the optical element, etc. are filled with patterns to highlight various components. It may be understood that the filling patterns are mainly intend to highlight the components so that the technical scheme of the present disclosure can be understood better, rather than indicating the actual existence of the corresponding patterns in the structure.

Figure 6:
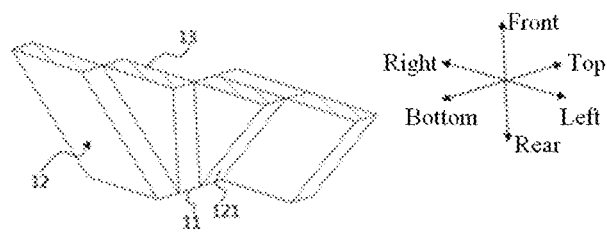
FIG. 6 is a first schematic structural diagram of the optical element in a second embodiment of the present disclosure.
Figure 7:
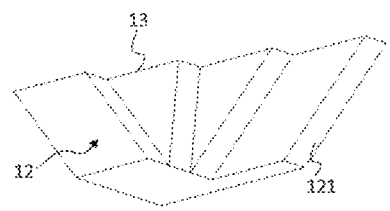
FIG. 7 is a second schematic structural diagram of the optical element in the second embodiment of the present disclosure.
Figure 8:
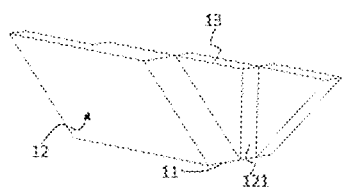
FIG. 8 is a third schematic structural diagram of the optical element in the second embodiment of the present disclosure.
Figure 9:
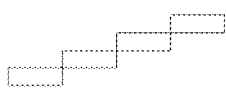
FIG. 9 is a lighting effect diagram of the optical element shown in FIG. 6, which is observed outside the vehicle light, in the second embodiment of the present disclosure.
Figure 10:
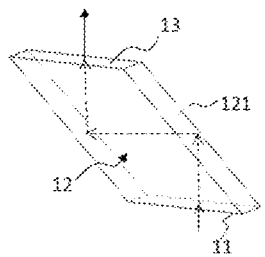
FIG. 10 is a first schematic structural diagram of the optical unit in the second embodiment of the present disclosure.
Figure 11:
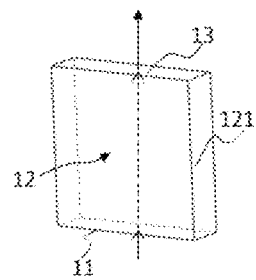
FIG. 11 is a second schematic structural diagram of the optical unit in the second embodiment of the present disclosure.
Figure 12:
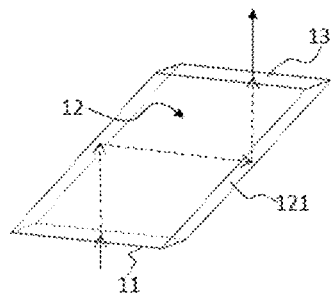
FIG. 12 is a third schematic structural diagram of the optical unit in the second embodiment of the present disclosure.
Figure 13:
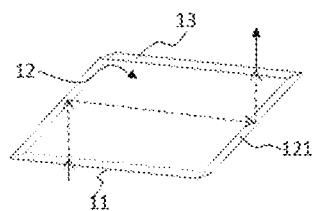
FIG. 13 is a fourth schematic structural diagram of the optical unit in the second embodiment of the present disclosure.

The vehicle light body space may have different structural dimensions, for example, the vehicle light body space may have a smaller space in the top-bottom direction and a greater space in the front-rear direction, or the vehicle light body space may have a greater space in the top-bottom direction and a small space in the front-rear direction. As a specific structural form of the optical element, the optical element shown in FIGS. 6 to 8 is suitable for use in a vehicle light body space that has a smaller space in the top-bottom direction and a greater space in the front-rear direction. The light-emitting surface 13 is located at the front side, the light incident surface of the optical element is located at the rear side, the light source may be arranged behind the light incident surface of the optical element to adapt to the space in the vehicle light body. Specifically, the light guide part 12 comprises two side surfaces 121, which are located on left and right sides of the light guide part 12 respectively, and the inclination angles of the side surfaces 121 with respect to the corresponding light incident surfaces 11 are different; as a preferred embodiment, the two side surfaces 121 located on the left and right sides of the same light guide part 12 are parallel to each other, and the side surfaces 121 may be used as reflecting surfaces; for example, the side surfaces 121 are provided with a reflection-enhancing film respectively to reflect the light to corresponding light-emitting surface 13, and the side surfaces 121 of the light guide parts 12 are arranged in an inclined manner with respect to the light incident surfaces 11; in addition, as shown in FIGS. 11 to 13, the side surfaces 121 of the light guide parts 12 are at different inclination angles with respect to the light incident surfaces 11, so that corresponding light-emitting surfaces 13 can be arranged in a preset form; according to the requirement for the arrangement of the light-emitting surfaces 13, as shown in FIG. 11, the side surface 121 of some of the light guide parts 12 may be arranged perpendicularly with respect to the light incident surfaces 11. The light incident surface of the optical element is formed by connecting the light incident surfaces 11 in the same plane. In the embodiment shown in FIG. 6, the light incident surface of the optical element is rectangular, and the light is incident into the light incident surface of the optical element, diverted by the light guide parts 12, and reflected by the side surfaces 121 to corresponding light-emitting surface 13. FIG. 9 shows a lighting effect of the light-emitting surfaces 13 of the optical element in this structural form, which is observed at a position outside the vehicle light. The light-emitting surfaces 13 are arranged in a stepped form in the same plane, and exhibit a novel lighting effect of the vehicle light. Of course, alternatively the light-emitting surfaces 13 may be arranged in a depth form, i.e., the light guide parts 12 are different in length in the front-rear direction, so that the light-emitting surfaces 13 are staggered in the front-rear direction. As shown in FIG. 13, the light incident surface 11 is only a part of the bottom portion of the optical unit, and the side surfaces 121 of the light guide part 12 may be arranged in an inclined manner with respect to the light incident surface 11, so that the light enters the light incident surface 11, diverted by the light guide part 12, and reflected by the side surfaces 121 to the corresponding light-emitting surface 13.

As a specific structural form of the optical element, as shown in FIG. 1, the optical element is suitable for use in a vehicle light body space that has a greater space in the top-bottom direction and a smaller space in the front-rear direction. The light-emitting surface 13 faces forward, the light incident surface of the optical element is located at the bottom of the optical element, and the light incident into the light incident surface of the optical element is reflected by a first reflecting surface 21 to the light-emitting surface 13 and then emerges from the light-emitting surface 13. Specifically, a first reflecting surface 21 is arranged between the light guide part 12 and the corresponding light-emitting surface 13, and the first reflecting surface 21 is arranged in an inclined manner with respect to the light-emitting surface 13, so that the light emerging from the light guide part 12 can be reflected to the corresponding light-emitting surface 13 and then emerges from the light-emitting surface 13. After the optical element in the present disclosure is installed in a vehicle light, when viewed from a position outside the vehicle light, it is seen that the light-emitting surfaces 13 are arranged in a preset form; when viewed from another position outside the vehicle light, it is seen that a plurality of light-emitting surfaces 13 are arranged in a depth form, and the light-emitting surfaces 13 are staggered in the front-rear direction, exhibiting a three-dimensional effect and a novel shape. The first reflecting surface 21 may be a fully reflecting surface with a high light reflecting efficiency, and, in order to enhance the reflection effect, a reflection-enhancing film may be provided on the first reflecting surface 21.

Figure 27:
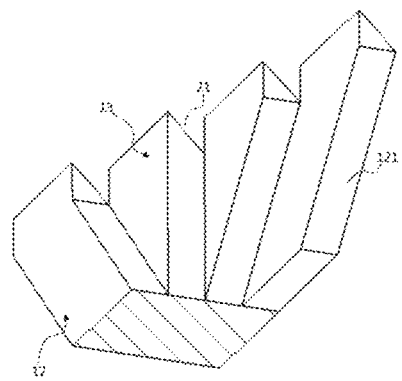
FIG. 27 is a first schematic structural diagram of the optical element in the first embodiment of the present disclosure.
Figure 28:
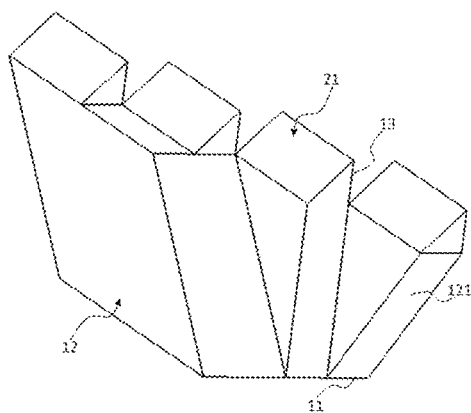
FIG. 28 is a second schematic structural diagram of the optical element in the first embodiment of the present disclosure.

In a specific embodiment, as shown in FIGS. 27 and 28, the light-emitting surfaces 13 the optical units may be in the same width as the light incident surfaces 11. Furthermore, in the embodiment shown in FIG. 27, the light incident surface of the optical element is a rectangular light incident surface, and can be evenly divided into the light incident surfaces 11, and an included angle between the first reflecting surface 21 and a corresponding light incident surface 11 is within a range of 30 to 90 degrees, preferably is 45 degrees. The included angle may be selected as required, as long as the first reflecting surface 21 can reflect the light incident into a corresponding light incident surface 11 to a corresponding light-emitting surface 13. For example, the size of the rectangular light incident surface is 40 mm*40 mm, and if the desired width of the light-emitting surface 13 is 10 mm, four optical units may be provided, and the width of the light incident surface 11 of each optical unit is 10 mm, so that a long strip-shaped vehicle light with a light-emitting surface 13 in width of 10 mm can be obtained.

Figure 31:
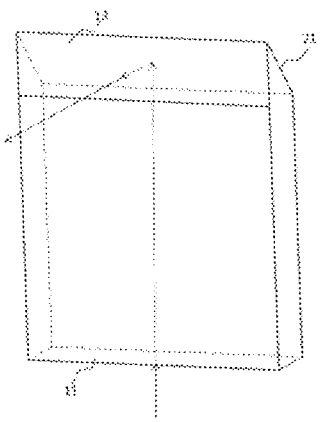
FIG. 31 is a second schematic structural diagram of the optical unit in the first embodiment of the present disclosure.
Figure 32:
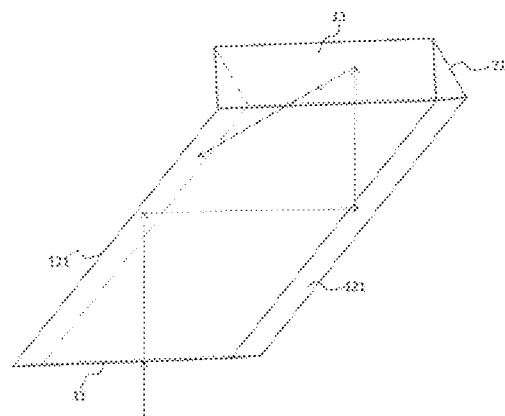
FIG. 32 is a third schematic structural diagram of the optical unit in the first embodiment of the present disclosure.
Figure 33:
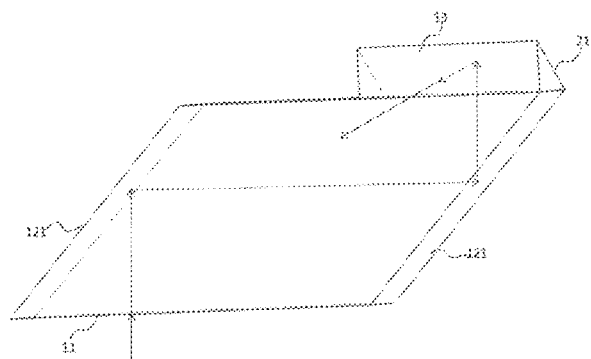
FIG. 33 is a fourth schematic structural diagram of the optical unit in the first embodiment of the present disclosure.
Figure 34:
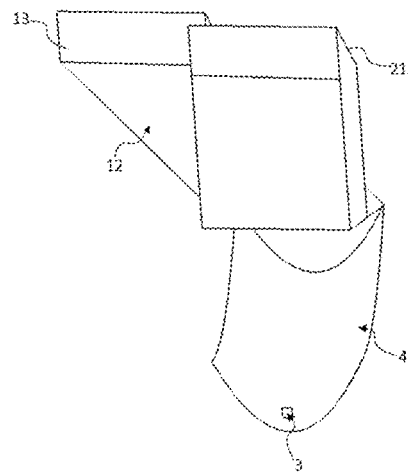
FIG. 34 is a first structural schematic diagram of the vehicle light module in a sixth embodiment of the present disclosure.
Figure 35:
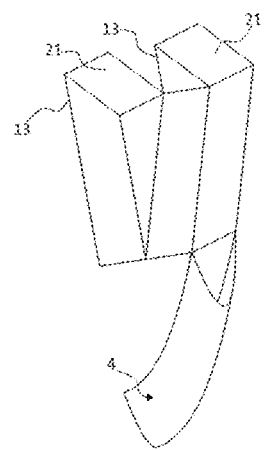
FIG. 35 is a second structural schematic diagram of the vehicle light module in the sixth embodiment of the present disclosure.
Figure 36:
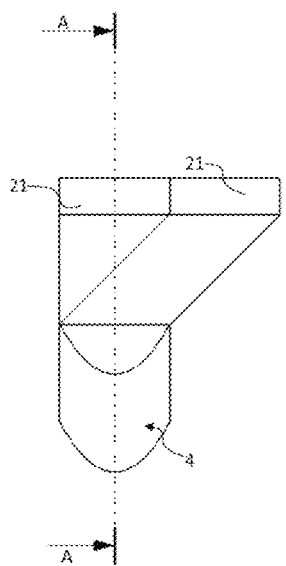
FIG. 36 is a third structural schematic diagram of the vehicle light module in the sixth embodiment of the present disclosure.

As shown in FIGS. 30 to 33, the inclined angles formed by the side surfaces 121 of the light guide part 12 with respect to the light incident surfaces 11 are different from each other, and a first reflecting surface 21 is arranged between each light guide part 12 and a corresponding light-emitting surface 13, so that the light incident into the light incident surface 11 is reflected by one side surface 121, then reflected by the other side surface 121 to the first reflecting surface 21, and then reflected to the corresponding light-emitting surface 13, thus achieving a preset lighting effect; according to the requirement for the arrangement of the light-emitting surfaces 13, as shown in FIG. 31, the side surfaces 121 of some of the light guide parts 12 may be arranged perpendicularly with respect to the light incident surfaces 11, and the parallel incident light is directly reflected by the first reflecting surfaces 21 to corresponding light-emitting surfaces 13 without being reflected by the side surfaces 121 arranged perpendicularly with respect to the light incident surfaces.

Figure 29:
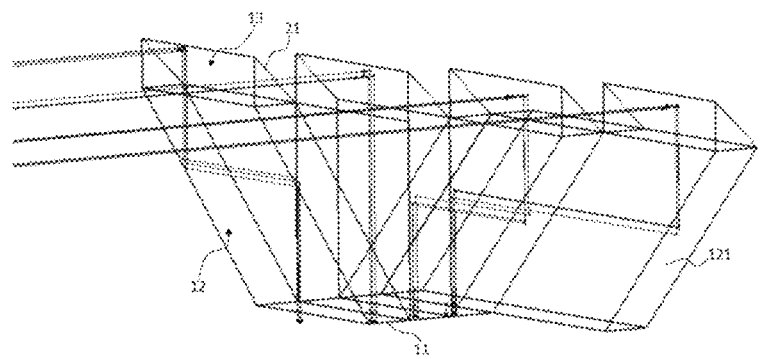
FIG. 29 is a schematic diagram of the light path of the optical element in the first embodiment of the present disclosure.
Figure 30:
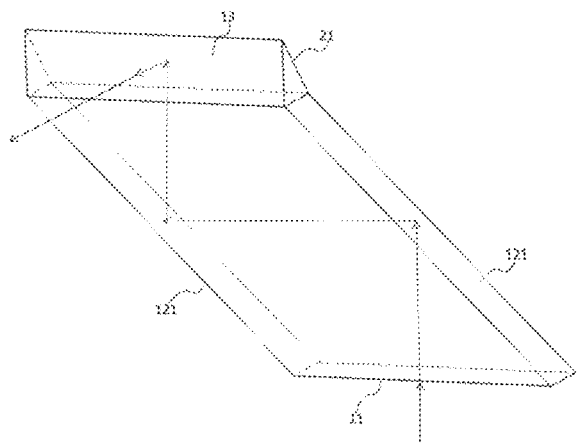
FIG. 30 is a first schematic structural diagram of the optical unit in the first embodiment of the present disclosure.

As shown in FIG. 29, in the technical concept of the present disclosure, light-emitting surfaces 13 in any width can be obtained; specifically, light-emitting surfaces 13 in narrower width equal to or smaller than 10 mm can be obtained, and the optical efficiency is high. The light incident into each light incident surface 11 is directly guided to the light-emitting surface 13 through the light guide part 12; alternatively, the light incident into each light incident surface 11 is guided to the first reflecting surface 21 through the light guide part 12, and then is reflected by the first reflecting surface 21 to a corresponding light-emitting surface 13, thereby a preset lighting effect is obtained.

The light-emitting surface 13 may be designed according to the design requirement to form a desired lighting shape. The light-emitting surface 13 may be composed of a plurality of light-emitting unit surfaces 131 arranged in a preset form. In the embodiment shown in FIGS. 22 to 24, the light-emitting unit surfaces 131 are arranged in the top-bottom direction as shown in the figures, and the light-emitting unit surfaces 131 is square, thereby the lighting effect shown in FIGS. 25 and 26 can be formed. Thus, the lighting effects of a vehicle lamp can be more diversified. Of course, the specific design of the light-emitting surfaces 13 is not limited to the above example. The light-emitting surfaces 13 may be arranged in other shapes and forms. For example, the light-emitting unit surfaces 131 may be circular, and the light-emitting unit surfaces 131 may be arranged in an annular form, etc.

Figure 17:
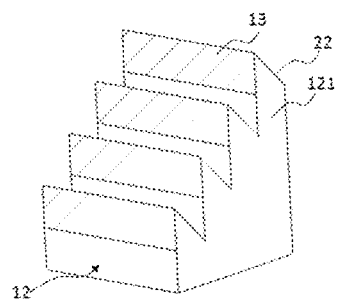
FIG. 17 is a first schematic structural diagram of the optical element in a fourth embodiment of the present disclosure.
Figure 18:
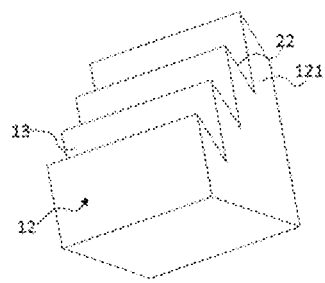
FIG. 18 is a second schematic structural diagram of the optical element in the fourth embodiment of the present disclosure.
Figure 19:
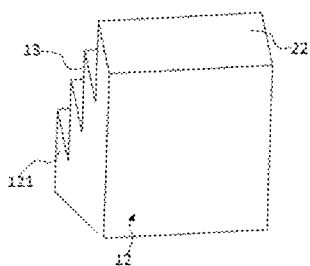
FIG. 19 is a third schematic structural diagram of the optical element in the fourth embodiment of the present disclosure.
Figure 20:
FIG. 20 is a first lighting effect diagram of the optical element shown in FIG. 18, which is observed outside the vehicle light, in the fourth embodiment of the present disclosure.
Figure 21:
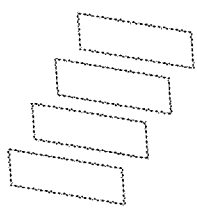
FIG. 21 is a second lighting effect diagram of the optical element shown in FIG. 18, which is observed outside the vehicle light, in the fourth embodiment of the present disclosure.
Figure 22:
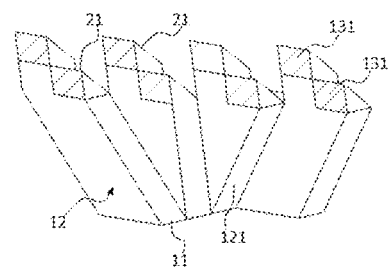
FIG. 22 is a first schematic structural diagram of the optical element in a fifth embodiment of the present disclosure.
Figure 23:
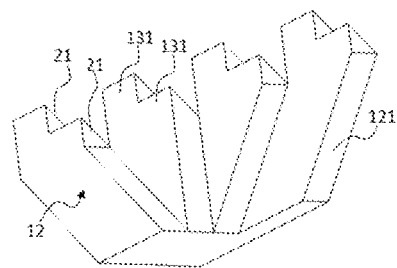
FIG. 23 is a second schematic structural diagram of the optical element in the fifth embodiment of the present disclosure.
Figure 24:
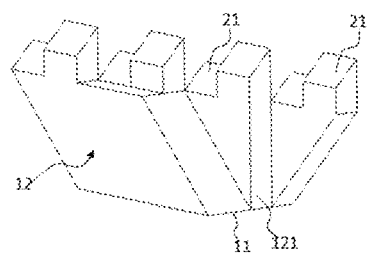
FIG. 24 is a third schematic structural diagram of the optical element in the fifth embodiment of the present disclosure.
Figure 25:
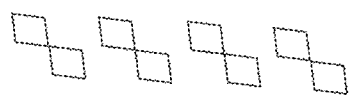
FIG. 25 is a first lighting effect diagram of the optical element shown in FIG. 22, which is observed outside the vehicle light, in the fifth embodiment of the present disclosure.
Figure 26:
FIG. 26 is a second lighting effect diagram of the optical element shown in FIG. 22, which is observed outside the vehicle light, in the fifth embodiment of the present disclosure.

As a specific structural form of the optical element, as shown in FIGS. 17 to 19, the optical units are arranged in sequence in the front-rear direction, and are not staggered in the left-right direction. That is to say, the side surfaces 121 on the same side of the light guide portions 12 are located in the same plane, a second reflecting surface 22 is arranged between each light guide part 12 and a corresponding light-emitting surface 13, and the second reflecting surface 22 is arranged in an inclined manner with respect to the light-emitting surface 13, so that the light emerging from the light guide part 12 can be reflected to a corresponding light-emitting surface 13 and then emerges from the light-emitting surface 13. After the optical element in the present disclosure is installed in a vehicle light, as shown in FIG. 20, when viewed from a position outside the vehicle light, it is seen that the light-emitting 13 surfaces are arranged in the top-bottom direction; as shown in FIG. 21, when viewed from another position outside the vehicle light, a vertical lighting effect achieved by an arrangement in a depth form can be seen, and the light-emitting surfaces 13 are staggered in the front-rear direction, exhibiting a three-dimensional effect and a novel shape. The second reflecting surface 22 may be a fully reflecting surface with a high light reflecting efficiency, and, in order to enhance the reflection effect, a reflection-enhancing film may be provided on the second reflecting surface 22. An included angle between the second reflecting surface 22 and a corresponding light incident surface 11 may be 30 to 90 degrees, preferably is 45 degrees; in the embodiment shown in FIG. 17, the side surfaces 121 of each light guide part 12 are perpendicular to the light incident surface 11; it can be understood that the side surfaces 121 of each light guide part 12 may alternatively be arranged in an inclined manner at the same angle with respect to the light incident surface 11, and the light-emitting surface 13 may be in a shape of parallelogram accordingly; alternatively, as shown in FIGS. 22 to 24, the light-emitting surface 13 may be composed of a plurality of light-emitting unit surfaces 131 arranged in a preset form.

Figure 14:
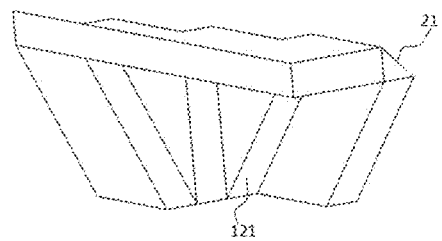
FIG. 14 is a first schematic structural diagram of the optical element in a third embodiment of the present disclosure.
Figure 15:
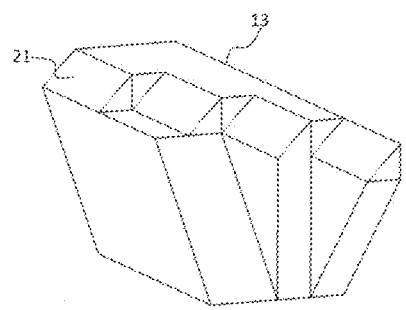
FIG. 15 is a second schematic structural diagram of the optical element in the third embodiment of the present disclosure.
Figure 16:
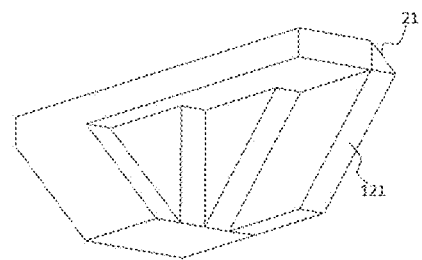
FIG. 16 is a third schematic structural diagram of the optical element in the third embodiment of the present disclosure.

In addition, as shown in FIGS. 14 to 16, alternatively the light-emitting surfaces 13 may be located in the same plane, which is to say, on the basis of FIG. 1, three of the light-emitting surfaces 13 are moved forward to be in the same plane as the other light-emitting surface 13, so as to form an optical element in a new structural form; thus, the light emergent surface of the optical element as shown in FIG. 14 is formed, and is in a long and narrow shape, thereby the lighting effect of the vehicle light is in a strip from when viewed at any angle in front of the vehicle.

It may be noted that the light guide part 12 may be a hollow light guide, so that the optical unit is a hollow optical element enclosed by optical surfaces including the light incident surface, the light guide part 12, the reflecting surfaces (the side surfaces 121 or the first reflecting surface 21 or the second reflecting surface 22) and the light-emitting surface 13 of the optical element; alternatively the light guide part 12 may be a solid light guide, so that the optical unit is a solid optical element enclosed by optical surfaces including the light incident surface, the light guide part 12, the reflecting surfaces (the side surfaces 121 or the first reflecting surface 21 or the second reflecting surface 22), and the light-emitting surface 13 of the optical element. For the optical surfaces on the optical unit, in order to prevent the light from being reflected on other side surfaces except the light incident surface 11, the reflecting surfaces and the light-emitting surface 13, such as front and rear surfaces of the light guide part 12, or prevent the light from being emitted through those side surfaces to form stray light that is not conducive to the lighting of the vehicle light, a dermatoglyph pattern or black opaque coating, such as black paint, may be applied on those side surfaces.

In the above embodiments, for the convenience of understanding, the light incident surface of the optical element is mainly described as a rectangular light incident surface. The light incident surface of the optical element is divided into a plurality of light incident surfaces 11, and a plurality of optical units are formed accordingly, so that the light incident into the light incident surfaces of the optical element is diverted by the light guide parts 12 to corresponding light-emitting surfaces 13, so as to achieve a preset lighting effect. It may be noted that the light incident surface of the optical element is not limited to a rectangular light incident surface, and may be in other shapes.

It can be seen from the light path diagrams of the optical elements and the optical units shown in FIGS. 29 to 33: in the case that the optical element is suitable for use in a vehicle light body space that has a greater space in the top-bottom direction and a smaller space in the front-rear direction, the light enters the light incident surface 11 at the bottom in the figures, is guided through the light guide part 12 to the first reflecting surface 21, and then is reflected by the first reflecting surface 21 to a corresponding light-emitting surface 13, or the light is guided through the light guide part 12 to one side surface 121, reflected to the other side surface 121, then reflected to the first reflecting surface 21, and finally reflected by the first reflecting surface 21 to a corresponding light-emitting surface 13, and emerges from the light-emitting surface 13.

In order to ensure the light-emitting efficiency of the light-emitting surfaces 13, it is desired that the light beams incident into the light incident surface 11 may be parallel as far as possible. Therefore, a collimating optical unit for collimating the light emitted from the light source 3 may be arranged below the light incident surface of the optical element as shown in the figure, and the optical element in the above embodiment of the present disclosure may be combined with the collimating optical unit to form a vehicle light module. Several specific embodiments of the collimating optical unit will be described below.

Figure 37:
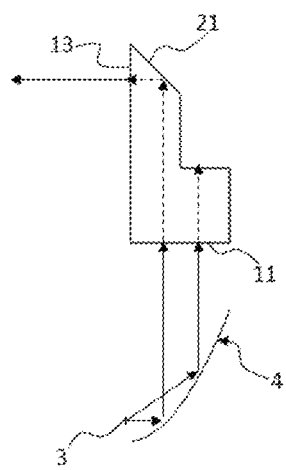
FIG. 37 is a schematic diagram of the light path of the vehicle light module in the sixth embodiment of the present disclosure.
Figure 38:
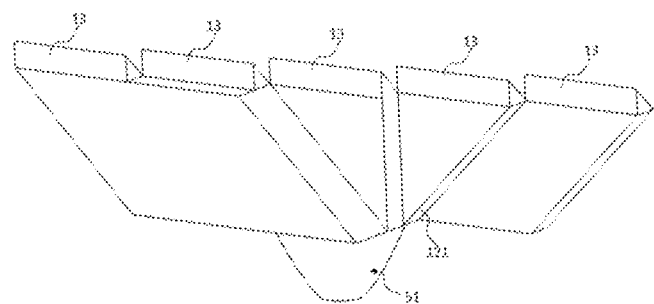
FIG. 38 is a first structural schematic diagram of the vehicle light module in a seventh embodiment of the present disclosure.
Figure 39:
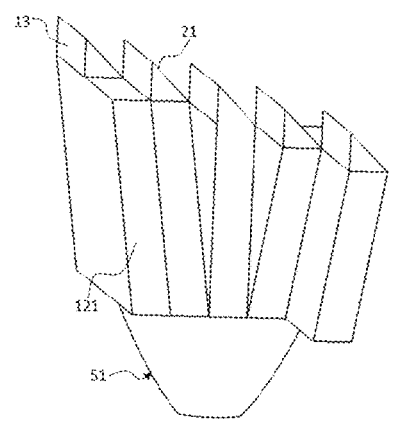
FIG. 39 is a second structural schematic diagram of the vehicle light module in the seventh embodiment of the present disclosure.
Figure 40:
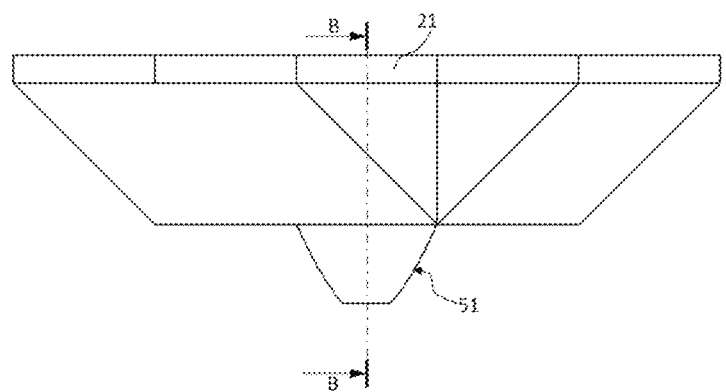
FIG. 40 is a third structural schematic diagram of the vehicle light module in the seventh embodiment of the present disclosure.
Figure 41:
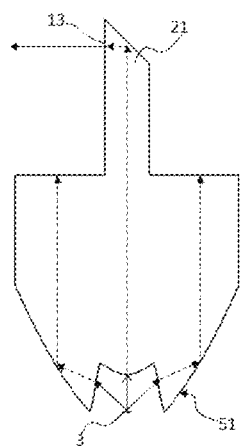
FIG. 41 is a schematic diagram of the light path of the vehicle light module in the seventh embodiment of the present disclosure.
Figure 42:
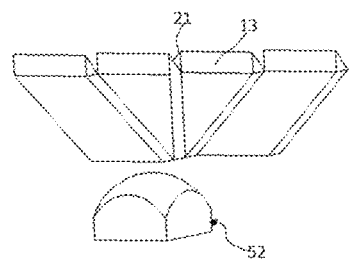
FIG. 42 is a first structural schematic diagram of the vehicle light module in an eighth embodiment of the present disclosure.
Figure 42:
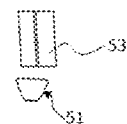
Figure 43:
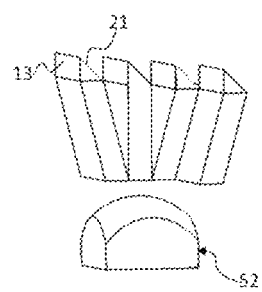
FIG. 43 is a second structural schematic diagram of the vehicle light module in the eighth embodiment of the present disclosure.
Figure 43:
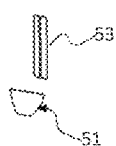
Figure 44:
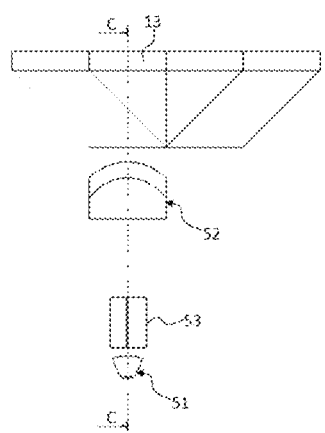
FIG. 44 is a third structural schematic diagram of the vehicle light module in the eighth embodiment of the present disclosure.

As a specific embodiment of the collimating optical unit, as shown in FIGS. 34 to 37, the collimating optical unit is a parabolic reflector 4, which is located below the light incident surface of the optical element. The light source 3 may be located in the focal area of the parabolic reflector 4, which is to say, the light source 3 may be located at or near the focal point of the parabolic reflector 4. As shown in FIG. 37, the light emitted from the light source 3 is reflected by the parabolic reflector 4 in parallel or approximately parallel to the light incident surface of the optical element, and then, the light is diverted to corresponding light-emitting surfaces 13, thereby a preset lighting effect is achieved. For example, the light incident surface of the optical element may be a rectangular light incident surface of 30 mm×10 mm, and may be regarded as being divided into two light incident surfaces 11 of 30 mm×5 mm, so that light-emitting surfaces 13 in width of 5 mm can be realized.

As a specific embodiment of the collimating optical unit, as shown in FIGS. 38 to 41, the collimating optical unit comprises a light concentrating cup 51 integrally connected with the optical element, and the light source 3 may be arranged in the focus area of the light concentrating cup 51. The light concentrating cup 51 can concentrate and collimate the light emitted from the light source 3 to the light incident surface 11 of the optical element, and then the light is diverted to corresponding light emergent surfaces 13, thereby a preset lighting effect is achieved. For example, the light incident surface 11 of the optical element may be a rectangular light incident surface of 25 mm×25 mm, and may be regarded as being divided into five light incident surfaces 11 of 25 mm×5 mm, which correspond to five optical units, thus, light emergent surfaces 13 in width of 5 mm can be realized.

Furthermore, as shown in FIGS. 42 to 45, a first lens 52 may be arranged between the light concentrating cup 51 and the light incident surface of the optical element, and the light concentrating cup 51 is combined with the first lens 52 to form a collimating optical unit, which can concentrate and collimate the light emitted from the light source 3 to the light incident surface 11 of the optical element, and then the light is diverted to corresponding light-emitting surfaces 13, thereby a preset lighting effect is achieved. The first lens 52 may be a plano-convex lens, a biconvex lens, or any other convex lens capable of concentrating and collimating light.

Figure 45:
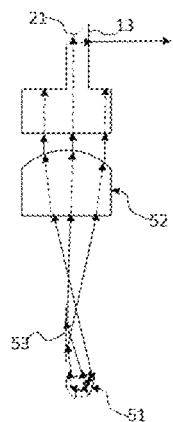
FIG. 45 is a schematic diagram of the light path of the vehicle light module in the eighth embodiment of the present disclosure.
Figure 46:
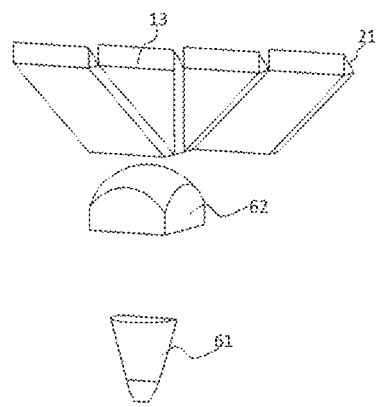
FIG. 46 is a first structural schematic diagram of the vehicle light module in a ninth embodiment of the present disclosure.
Figure 47:
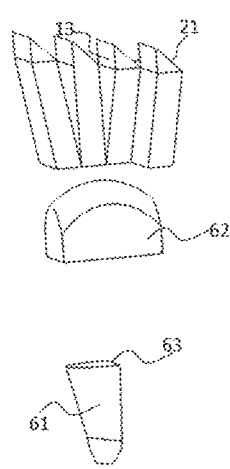
FIG. 47 is a second structural schematic diagram of the vehicle light module in the ninth embodiment of the present disclosure.
Figure 48:
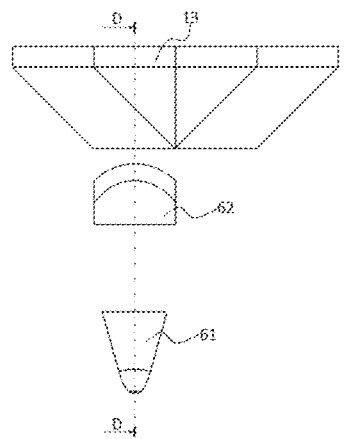
FIG. 48 is a third structural schematic diagram of the vehicle light module in the ninth embodiment of the present disclosure.

Furthermore, a light baffle plate 53 may be provided between the first lens 52 and the light concentrating cup 51, and the light baffle plate 53 is used to form a low-beam cutoff line. Specifically, as shown in FIG. 45, the light emerging from the light concentrating cup 51 is partially blocked by the light baffle plate 53, so that the light emerging from the light-emitting surface 13 can form a low-beam light shape with a low-beam cutoff line.

As a specific embodiment of the collimating optical unit, as shown in FIGS. 46 to 49, the collimating optical unit comprises a light concentrator 61 and a second lens 62. The light concentrator 61 is located below the light incident surface 11 of the optical element, and the second lens 62 is located between the light concentrator 61 and the light incident surface 11 of the optical element. The light source 3 is located at the focal point of the light concentrator 61. The light emitted from the light source 3 is concentrated to the second lens 62 through the light concentrator 61, and then is further concentrated and collimated by the second lens 62 to the light incident surface of the optical element, then the light is diverted to corresponding light-emitting surfaces 13, thereby a preset lighting effect is achieved.

Specifically, the light concentrator 61 comprises a cone-shaped light incident end and a light transmission portion, the light incident end is connected with the light transmission portion, and has a recessed groove structure, the bottom of the groove structure has an outward protruding structure, the light source 3 is arranged at the groove opening of the groove structure. The groove structure and the outward protruding structure in the groove structure can concentrate light, so that the concentrated light can be directed to the light transmission portion and transmitted through the light transmission portion to the second lens 62. The second lens 62 may be a plano-convex lens, a biconvex lens, or any other convex lens capable of concentrating and collimating light.

Figure 49:
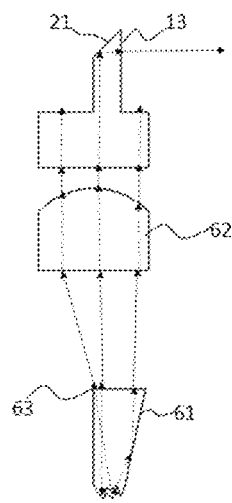
FIG. 49 is a schematic diagram of the light path of the vehicle light module in the ninth embodiment of the present disclosure.
Figure 50:
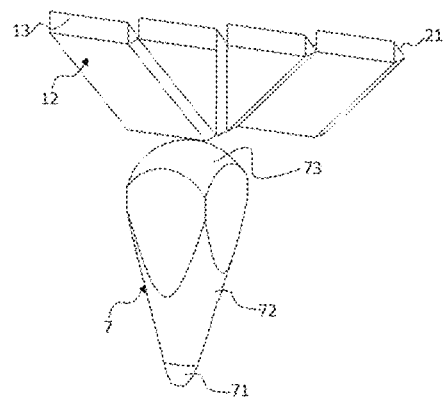
FIG. 50 is a first structural schematic diagram of the vehicle light module in a tenth embodiment of the present disclosure.
Figure 51:
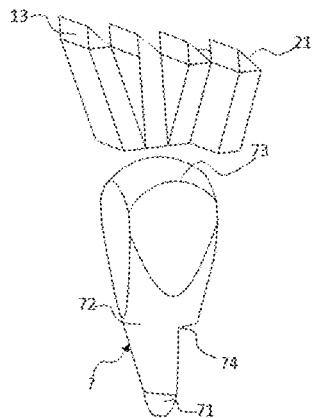
FIG. 51 is a second structural schematic diagram of the vehicle light module in the tenth embodiment of the present disclosure.
Figure 52:
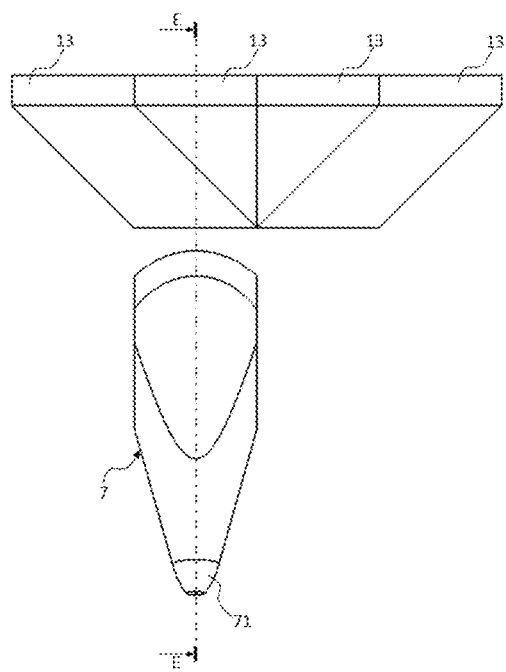
FIG. 52 is a third structural schematic diagram of the vehicle light module in the tenth embodiment of the present disclosure.
Figure 54:
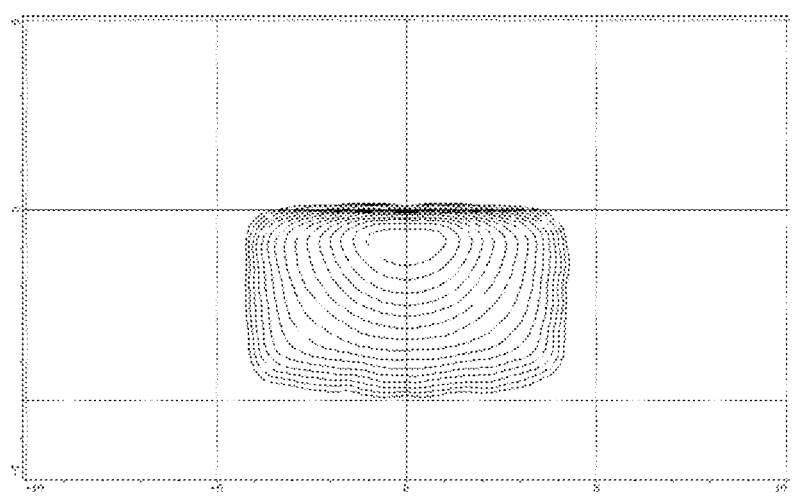
FIG. 54 is a schematic diagram of the light shape in a specific embodiment of the present disclosure.

Furthermore, as shown in FIG. 49, the light concentrator 61 is provided with a first cutoff line structure 63 on a rear edge of an upper end face of the light concentrator 61 for forming a low-beam cutoff line. That is to say, a first cutoff line structure 63 is arranged on the rear edge of the upper end face of the light transmission portion, so that the outgoing light can form a low-beam light shape with a low-beam cutoff line. Please see FIG. 54, which shows a light shape formed by projecting the light emergent from the light-emitting surface 13 corresponding to the collimating optical unit in this embodiment to a light distribution screen. The light shape has an auxiliary low-beam cutoff line at the Zero-degree scale line. By arranging a light diffusion structure (e.g., a dermatoglyph pattern or other microstructures) on the light-emitting surface 13 of the optical element, the broadening angle of the light shape can be increased to meet the requirement for broadening of auxiliary low beam.

As a specific embodiment of the collimating optical unit, as shown in FIGS. 50 to 53, the collimating optical unit is a collimating light guide element 7, which is an integrally formed element comprising a light incident portion 71, a light transmission portion 72 and a light-emitting portion 73 that are connected sequentially and integrally formed. The light incident portion 71 is a concentrating structure for concentrating light, and has a conical light incident end with a recessed groove structure, and the bottom of the groove structure has an outward protruding structure. The light source 3 is arranged at the groove opening of the groove structure, and the groove structure and the outward protruding structure in the groove structure can concentrate light, so that the concentrated light is directed to the light transmission portion 72. The light-emitting portion 73 is a curved surface protruding toward the light incident surface of the optical element, and the light emerges from the light-emitting portion 73 to the light incident surface of the optical element.

Figure 53:
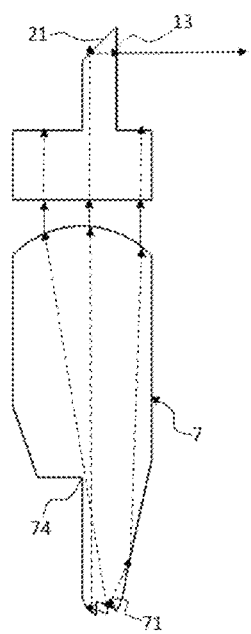
FIG. 53 is a schematic diagram of the light path of the vehicle light module in the tenth embodiment of the present disclosure.

Furthermore, as shown in FIG. 53, the light transmission portion 72 is provided with a second cutoff line structure 74, which is used to form a low-beam cutoff line, so that the outgoing light can form a low beam light shape with a low-beam cutoff line. Please see FIG. 54, which shows a light shape formed by projecting the light emergent from the light emergent surface corresponding to the collimating optical unit in this embodiment to a light distribution screen. The light shape has an auxiliary low-beam cutoff line at the Zero-degree scale line. By arranging a light diffusion structure (e.g., a dermatoglyph pattern or other microstructures) on the light emergent surface of the optical element, the broadening angle of the light shape can be increased to meet the requirement for broadening of auxiliary low beam. Specifically, the light emitted from the light source 3 is concentrated by the light incident portion 71 and directed to the light transmission portion 72. After passing through the second cutoff line structure 74, the light is transmitted to the light-emitting portion 73, and then directed to the light incident surface of the optical element, then the light is diverted by the optical units to the light-emitting surfaces 13 and emerge from the light emergent surfaces 13 to form a low-beam light shape.

Generally, the light source 3 may be an LED light source, a laser light source or the like.

As can be seen from the above embodiments, the design concept of the optical element in the present disclosure can realize light-emitting surfaces 13 different in width and length, and realize a linear vehicle light shape; a specific collimating optical unit and the number of rectangular light incident surfaces can be selected according to the customer's requirement for the size of the light-emitting surface 13; besides, diversified lighting shapes can be realized according to different structures of the optical element. Compared with the prior art, the vehicle light shapes are more diversified and in line with the current development trend of vehicle light shapes.

An embodiment of the vehicle light in the present disclosure may have the vehicle light module described in any of the above embodiments; that is to say, the vehicle light employs all the technical schemes in all above embodiments of vehicle light module. Therefore, the vehicle light at least has all the beneficial effects brought by the technical schemes in the above embodiments of vehicle light module.

An embodiment of the vehicle in the present disclosure may have the vehicle light described in any of the above embodiments; that is to say, the vehicle employs all the technical schemes in all above embodiments of vehicle light. Therefore, the vehicle at least has all the beneficial effects brought by the technical schemes in the above embodiments of vehicle light.

While some preferred embodiments of the present disclosure are described above in detail with reference to the accompanying drawings, the present disclosure is not limited to those embodiments. Various simple variations may be made to the technical scheme in the present disclosure, including combinations of the specific technical features in any appropriate form, within the scope of the technical ideal of the present disclosure. To avoid unnecessary repetitions, various possible combinations are not described specifically in the present disclosure. However, such simple variations and combinations shall also be deemed as having been disclosed herein and falling in the scope of protection of the present disclosure.

REFERENCE NUMBERS

| | |
|---|---|
| 11 - light incident surface | 12 - light guide part |
| 121 - side surface | 13 - light-emitting surface |
| 21 - first reflecting surface | 22 - second reflecting surface |
| 131 - light-emitting unit surface | 3 - light source |
| 4 - parabolic reflector | 51 - light concentrating cup |
| 52 - first lens | 53 - light baffle plate |
| 61 - light concentrator | 62 - second lens |
| 63 - first cutoff line structure | 7 - collimating light guide element |
| 71 - light incident portion | 72 - light transmission portion |
| 73 - light-emitting portion | 74 - second cutoff line structure |

The invention claimed is:

1. An optical element, comprising: a plurality of optical units, each optical unit comprises a light incident surface, a light guide part, and a light-emitting surface, the light incident surfaces are located on the same plane and are successively connected so as to form an optical element light incident surface; each light guide part is arranged to be capable of diverting the light incident into the optical element light incident surface to the corresponding light-emitting surface; and the light-emitting surfaces are arranged in a preset form;

wherein the light guide part comprises side surfaces at different non-symmetric inclination angles with respect to each other and to the corresponding light incident surface, the side surfaces are located on left and right sides of the light guide part, and a part of the light incident through the light incident surface can be reflected when reaching each side surface;

wherein a first reflecting surface is arranged between the light guide part and the corresponding light-emitting surface, and the first reflecting surface is arranged to be capable of reflecting the light emerging from the light guide part to the corresponding light-emitting surface so that the light emerges from the light-emitting surface.

2. The optical element according to claim 1, wherein the first reflecting surface is a fully reflecting surface; and/or a first reflecting surface is provided with a reflection-enhancing film.

3. The optical element according to claim 1, wherein an included angle between the first reflecting surface and the corresponding light incident surface is 30-90 degrees.

4. The optical element according to claim 1, wherein the side surface is provided with a reflection-enhancing film.

5. The optical element according to claim 1, wherein the side surfaces on the same side of the light guide part are located in the same plane, a second reflecting surface is arranged between each light guide part and the corresponding light-emitting surface, and the second reflecting surface is arranged to be capable of reflecting the light emerging from the light guide part to the corresponding light-emitting surface so that the light emerges from the light-emitting surface.

6. The optical element according to claim 1, wherein the light-emitting surfaces are located in the same plane and connected in sequence to form a light emergent surface of the optical element.

7. The optical element according to claim 1, wherein the light-emitting surface comprises a plurality of light emergent unit surfaces arranged in a preset form;
and/or the width of the light incident surface is the same as the width of the light-emitting surface;
and/or the plurality of optical units are connected to form an integrally formed part.

8. A vehicle light module provided with a collimating optical unit and the optical element according to claim 1, wherein the collimating optical unit is arranged to be capable of concentrating and collimating the light emitted from a light source to the light incident surface of the optical element.

9. The vehicle light module according to claim 8, wherein the collimating optical unit is a parabolic reflector, which is arranged to be capable of reflecting the light emitted from the light source to the light incident surface of the optical element.

10. The vehicle light module according to claim 8, wherein the collimating optical unit comprises a light concentrating cup integrally connected with the optical element, and the light concentrating cup is arranged to be capable of concentrating and collimating the light emitted from the light source to the light incident surface of the optical element.

11. The vehicle light module according to claim 10, wherein the collimating optical unit further comprises a first lens, which is located between the light concentrating cup and the light incident surface of the optical element to concentrate and collimate the light emerging from the light concentrating cup to the light incident surface of the optical element.

12. The vehicle light module according to claim 11, wherein a light baffle plate is arranged between the first lens and the light concentrating cup for forming a low-beam cutoff line.

13. The vehicle light module according to claim 8, wherein the collimating optical unit comprises a light concentrator and a second lens that is located between the light concentrator and the light incident surface of the optical element to concentrate and collimate the light emerging from the light concentrator to the light incident surface of the optical element.

14. The vehicle light module according to claim 13, wherein the light concentrator is provided with a first cutoff line structure for forming a low-beam cutoff line on a rear edge of an upper end face of the light concentrator.

15. The vehicle light module according to claim 8, wherein the collimating optical unit is a collimating light guide element, which comprises a light incident portion, a light transmission portion and a light-emitting portion that are connected in sequence and integrally formed.

16. The vehicle light module according to claim 15, wherein the light incident portion is a concentrating structure for concentrating the light, and the light-emitting portion is a curved surface protruding toward the light incident surface of the optical element.

17. The vehicle lamp module according to claim 15, wherein the light transmission portion is provided with a second cutoff line structure for forming a low-beam cutoff line.

18. A vehicle light provided with the vehicle light module according to claim 8.

* * * * *